Patented Mar. 15, 1938

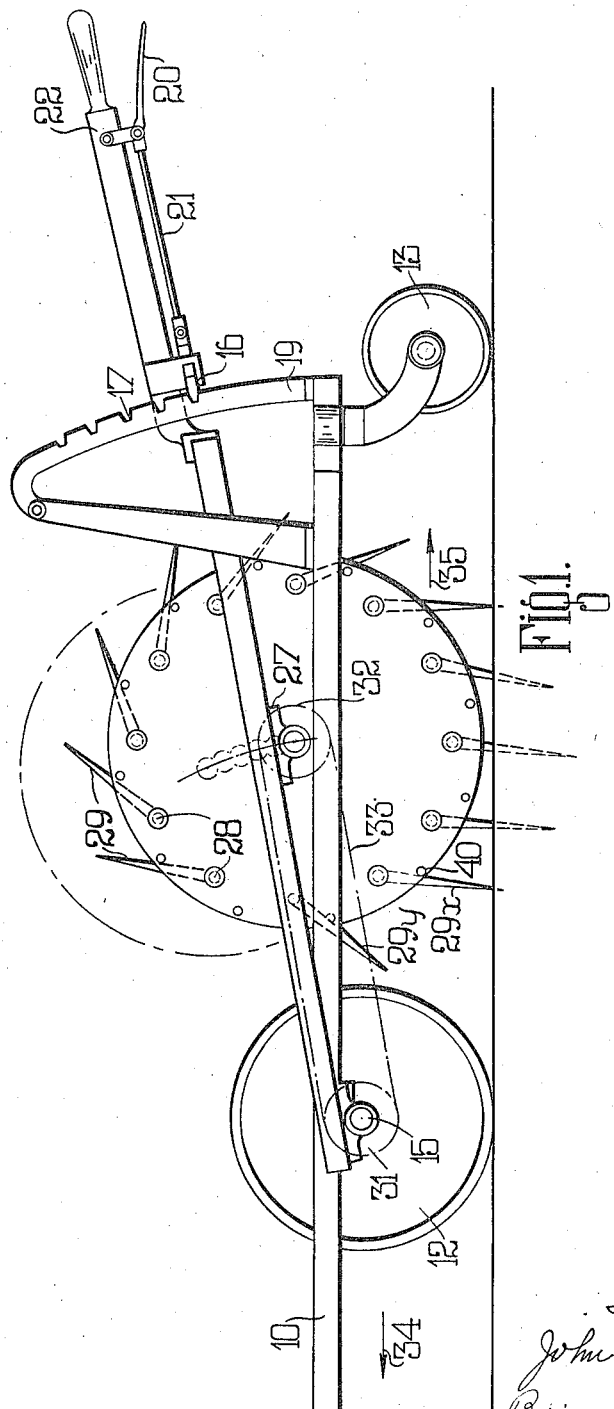

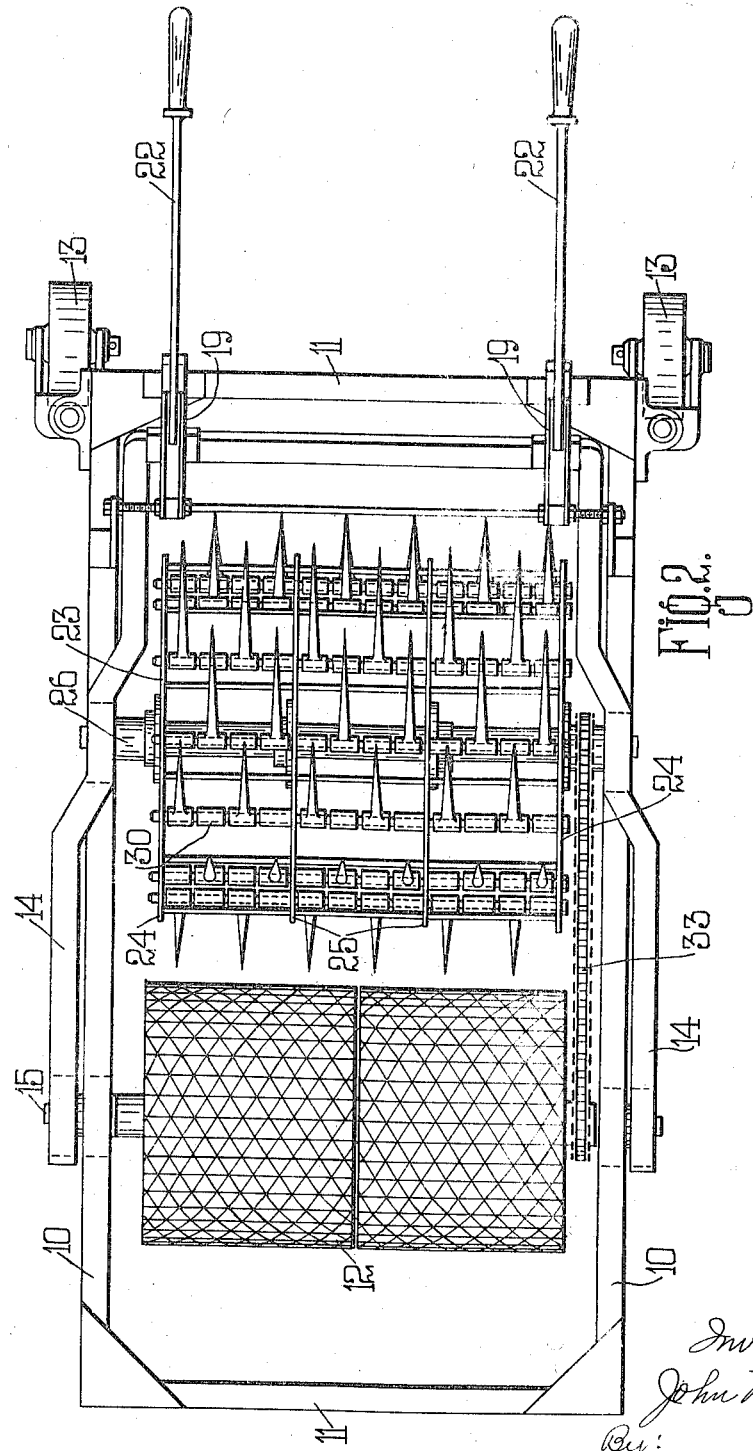

2,111,478

UNITED STATES PATENT OFFICE 2,111,478

DIBBLING MACHINE

John McGuire, Wirral, England

Application May 15, 1936, Serial No. 79,998
In Great Britain March 18, 1935

9 Claims. (Cl. 97—52)

The present invention relates to new and useful improvements in a method and machine for dibbling or spiking the ground for aeration thereof, the sowing of seed, or similar purposes, and the invention is particularly useful for dibbling or spiking the turf of golf courses for aeration.

An object of the present invention is to provide a dibbling or spiking machine which includes a wheelable carriage and wherein a plurality of spikes are mounted on the carriage for movement into and out of the ground at substantially the same angle relative thereto during movement of the carriage so as to prevent tearing of the ground.

A further object of the invention is to provide a machine of the above type wherein the ground piercing spikes are given, during the travel of the carriage over the ground, a component of movement substantially perpendicular to the surface of the ground for piercing the same and an effective component of movement substantially parallel to the surface of the ground opposite to the direction of travel of the carriage so as to maintain the substantially perpendicular position of the spikes during engagement with the ground and to thus prevent tearing of the ground.

A further object of the invention is to provide a machine of the above type wherein the ground piercing spikes are mounted on an endless conveyor carried by the carriage, and wherein the conveyor is adapted to impart to the spikes, during their engagement with the ground, a component of movement substantially parallel to the surface of the ground in a rearward direction substantially compensating for the forward movement of the carriage.

The above and other objects of the invention will in part be obvious and will be hereinafter more fully pointed out.

One form of construction of the invention is shown by way of example with reference to the accompanying drawings in which:—

Figure 1 is a side view,
Figure 2 a plan view.

In the arrangement shown in Figures 1 and 2, a main frame or wheelable carriage is formed by side girders 10 connected by end girders 11 and is supported by a pair of rollers 12 adjacent one end and a pair of caster wheels 13 adjacent the other end.

A sub-frame 14 is pivoted at one end on the axle 15 of the rollers 12 and is supported at its other end by detent elements 16 adapted for engagement in notches 17 of a pair of upstanding quadrants 19 so that the sub-frame 14 is capable of angular adjustment. Detents 16 are operated by levers 20 through rods 21 supported from extension arms 22 of the sub-frame 14 which serve as shafts by which the machine is traversed along the ground. A drum, indicated generally by the reference numeral 23, is made up of end discs 24 and intermediate discs 25 which are mounted upon a shaft 26 supported in bearings 27 of the sub-frame 14. The discs 24, 25 are further interconnected by spindles 28 on which the spikes 29 are pivoted and spaced apart by sleeves or tubes 30.

The drum 23 is rotated from the spindle 15 of the rollers 12 through sprockets 31, 32 and chain 33.

It will be appreciated that if the machine is moved in the direction of the arrow 34, the spikes moving in the lower part of their circular paths will have a component of speed parallel to the ground in the direction of the arrow 35, so that whilst a spike is in engagement with the ground it may have very little or no resultant movement in the horizontal direction. This result can be obtained by suitably choosing the relative radii of the drums 12 and 23 (the radius of the drum 23 being taken to be the distance between the centres of the shaft 26 and spindles 28).

It will be observed that with equal sprockets 31 and 32 shown in the drawings the drum 23 is made larger than the drums 12 so that its peripheral speed will be greater than the peripheral speed of the drums 12, and the drum 23 is dimensioned so that the resultant horizontal component of the arcuate movement of the spikes during their engagement with the ground will be approximately equal to the arcuate movement of the drum 12, i. e. the horizontal travel of the machine during the same period. The purpose of such an arrangement is to effect movement of the spikes into and out of the ground without tearing the same, and one way of accomplishing this result is to cause the spikes to move into and out of the ground at the same angle relative to the surface of the ground, this angle being preferably at right angles to the surface of the ground so that the spikes move vertically.

The optimum values of the radii of the drums 12 and 23 to achieve this result will depend upon the depth of penetration of the spikes required and an optimum value for the radius $r$ of the drums 12 for a given radius $b$ of drum 23 and a given penetration $p$ can be obtained from the equation $$gr \cos^{-1} \frac{b-p}{b} = \sqrt{2pb - p^2}$$

where $g$ is the ratio of the angular speed of the drums 12 to the angular speed of the drum 23.

If a machine is dimensioned in accordance with this equation then provided there is no slipping of the rollers 12 relatively to the ground a spike can be caused to enter the ground perpendicularly and to leave the ground perpendicularly. If the height of the drums 23 above the ground is adjusted by means of the detents 16 and quadrants 19, so that the penetration of the spikes is not equal to the value $p$ then of course these conditions will not be exactly obtained.

If desired, the spikes 29 may be caused to enter the ground in a slightly forwardly inclined direction as illustrated in the case of the spike 29$x$ in Figure 1. The angular disposition of the spikes 29 on entering the ground is governed by the rods 40 which extend transversely between the discs and against which the spikes 29 engage gravitationally as they approach the ground, as will be observed more particularly with reference to the spike 29$y$ shown in Figure 1.

According to the present invention, it will be seen that the substantially horizontal component of movement given to the spikes during their engagement with the ground is effected by causing the heads of the spikes to move in trochoidal paths of a curtate cycloidal type and causing engagement of the spikes with the ground during the movement of the heads of the spikes around the loops of the trochoidal paths.

It is, of course, to be clearly understood that various changes in the details of construction and arrangement of parts may be made without departing from the scope of the invention as set forth in the appended claims.

I declare that what I claim is:—

1. A machine for dibbling the ground comprising a wheelable carriage, a conveyor mounted on said carriage out of contact with the ground, a plurality of ground piercing spikes or dibbles freely pivoted to said conveyor, means for driving said conveyor during movement of the carriage along the ground to positively move the spikes in an endless path and rearwardly during engagement with the ground approximately to compensate for the forward movement of the carriage during engagement of the spikes with the ground and means for adjusting the height of said conveyor above the ground to alter the depth of penetration of the spikes.

2. A machine for dibbling the ground comprising a wheelable carriage, a sub-frame pivoted adjacent one end to said carriage and capable of angular adjustment relatively to the carriage, a conveyor mounted on said sub-frame out of contact with the ground, ground-piercing spikes or dibbles freely pivoted to said conveyor and means for driving said conveyor during movement of the carriage along the ground to positively move the spikes in an endless path and rearwardly during engagement with the ground approximately to compensate for the forward movement of the carriage during engagement of the spikes with the ground.

3. A machine for dibbling the ground comprising a wheelable carriage, a sub-frame pivoted adjacent one end to said carriage and capable of angular adjustment relatively to the carriage, a rotatable member mounted on said sub-frame out of contact with the ground, ground-piercing spikes or dibbles freely pivoted to said rotatable member and means for driving said conveyor during movement of the carriage along the ground to positively move the spikes in an endless path and rearwardly during engagement with the ground approximately to compensate for the forward movement of the carriage during engagement of the spikes with the ground.

4. A machine for dibbling the ground comprising a carriage, a rotatable member on said carriage out of contact with the ground, a plurality of ground-piercing spikes freely pivoted on said rotatable member for permitting free relative movement between the spikes and their pivots during the entire time the spikes are in engagement with the ground, and means for driving said rotatable member at a speed proportionate to the rate of travel of the carriage along the ground for causing said spikes, during the movement in the lower parts of their respective paths and during movement of the carriage along the ground, to engage and pierce the ground and to positively move in an arcuate path in a rearward direction relative to the carriage so that the spikes execute substantially no resultant longitudinal movement relative to the ground during their engagement therewith.

5. A machine for dibbling the ground comprising a carriage having at least one rollable supporting member, a rotatable member mounted on said carriage out of contact with the ground, a plurality of ground-piercing spikes freely pivoted on said rotatable member and permitting free relative movement between the spikes and their pivots during the entire time the spikes are in engagement with the ground, and transmission means intermediate said rollable supporting member and said rotatable member for driving said rotatable member in the same direction and at a greater peripheral speed than that of the said rollable supporting member for causing said spikes, during their movement in the lower parts of their respective paths and during movement of the carriage along the ground, to engage and pierce the ground and to positively move in an arcuate path in a rearward direction relative to the carriage so that the spikes execute substantially no resultant longitudinal movement relative to the ground during their engagement therewith.

6. A machine for dibbling the ground comprising a carriage having at least one rollable supporting member, a rotatable member mounted on said carriage out of contact with the ground, a plurality of ground-piercing spikes freely pivoted on said rotatable member for permitting free relative movement between the spikes and their pivots during the entire time the spikes are in engagement with the ground, and transmission means intermediate said rollable supporting member and said rotatable member for causing rotation of said rotatable member to impart a rearward movement to the heads of the spikes during engagement of the spikes with the ground whereby to approximately compensate for the forward movement of the carriage.

7. A machine for dibbling the ground comprising a carriage, a rotatable member mounted on said carriage out of contact with the ground, a plurality of ground-piercing spikes freely pivoted on said rotatable member for permitting free relative movement between the spikes and their pivots during the entire time the spikes are in engagement with the ground, means for determining the angle at which the spikes initially engage the ground, and means for driving said rotatable member at a speed proportionate to the rate of travel of the carriage along the ground for causing said spikes, during the movement in the lower parts of their respective paths and during movement of the carriage along the ground, to engage and pierce the ground and to positively move in an arcuate path in a rearward direction relative to the carriage so that the spikes execute substantially no resultant longitudinal movement relative to the ground during their engagement therewith.

8. A machine for dibbling the ground comprising a wheelable carriage, a conveyor mounted on said carriage out of contact with the ground, means for driving said conveyor, a plurality of ground-piercing spikes, and transverse pivots carried by said conveyor and on which said spikes are freely pivoted for permitting free relative rotation between the heads of the spikes and their pivots during the entire time the spikes are in engagement with the ground, and said conveyor operating to impart to the heads of the spikes a positive rearward movement during their engagement with the ground to approximately compensate for the forward movement of the carriage whereby to prevent tearing of the ground.

9. A machine for dibbling the ground comprising a carriage, wheels on which said carriage is mounted for movement over the ground, a rotatable conveyor member mounted on said carriage out of contact with the ground, means for driving said rotatable conveyor member at an angular speed equal to the wheels of said carriage, said rotatable conveyor member having a greater periphery than said wheels whereby the conveyor member is driven at a greater peripheral speed, a plurality of ground-piercing spikes, and transverse pivots carried by said conveyor and on which said spikes are freely pivoted for permitting free relative rotation between the heads of the spikes and their pivots during the entire time the spikes are in engagement with the ground, and said conveyor operating to impart to the heads of the spikes a positive rearward movement during their engagement with the ground to approximately compensate for the forward movement of the carriage whereby to prevent tearing of the ground.

JOHN McGUIRE.